United States Patent [19]
Peonski

[11] 3,863,352
[45] Feb. 4, 1975

[54] GAGING APPARATUS WITH FLOW CONTROL MECHANISM

[75] Inventor: Edward Peonski, West Dundee, Ill.

[73] Assignee: American Gage & Machine Company, Elgin, Ill.

[22] Filed: June 14, 1973

[21] Appl. No.: 369,898

[52] U.S. Cl. ............... 33/174 R, 198/165, 209/82, 209/88 R
[51] Int. Cl. ..... G01b 5/00, B65g 19/02, B65g 23/08
[58] Field of Search .......... 193/2 D; 198/26, 27, 43, 198/63, 116, 160, 165; 209/82, 88 R; 214/DIG. 3; 33/174 R

[56] References Cited
UNITED STATES PATENTS

| | | | |
|---|---|---|---|
| 3,153,485 | 10/1964 | West | 209/88 R |
| 3,339,705 | 9/1967 | Burkhardt et al. | 198/165 |
| 3,495,696 | 2/1970 | Molins et al. | 198/165 |
| 3,581,876 | 6/1971 | Keith | 198/165 |

Primary Examiner—Samuel B. Rothberg
Assistant Examiner—Richard R. Stearns
Attorney, Agent, or Firm—Burmeister, Palmatier & Hamby

[57] ABSTRACT

The illustrated gaging apparatus includes a gaging station having a gaging device which may be employed to check the finished size of work pieces as they are discharged from a grinding machine or some other machine tool. The signals from the gaging device may be employed to adjust the grinding machine so as to hold the size of the work pieces within the desired tolerances, despite the normal wear on the grinding wheel. The gaging apparatus includes a control mechanism for producing a steady flow of the work pieces past the gaging station at a uniform speed so that the accuracy of the gaging operation will not be effected by excessive or non-uniform speed of the work pieces as they are discharged from the grinding machine. The flow control mechanism includes guide means for supporting the work pieces, together with an endless belt for engaging the work pieces and propelling them along the guide means. The belt is threaded around a drive pulley and one or more additional pulleys which are mounted on a swingable supporting arm or carriage. Preferably the arm is swingable in a vertical plane about the axis of the drive pulley. By virtue of this arrangement, the supporting arm and the endless belt are swingable downwardly by gravity so so to maintain the belt in engagement with the work pieces. This mechanism is able to accommodate work pieces of various sizes without any change in the adjustment of the mechanism. The belt assumes control of the work pieces as they are discharged from the grinding machine and positively meters or moves the work pieces at a uniform speed into the gaging station.

1 Claim, 3 Drawing Figures

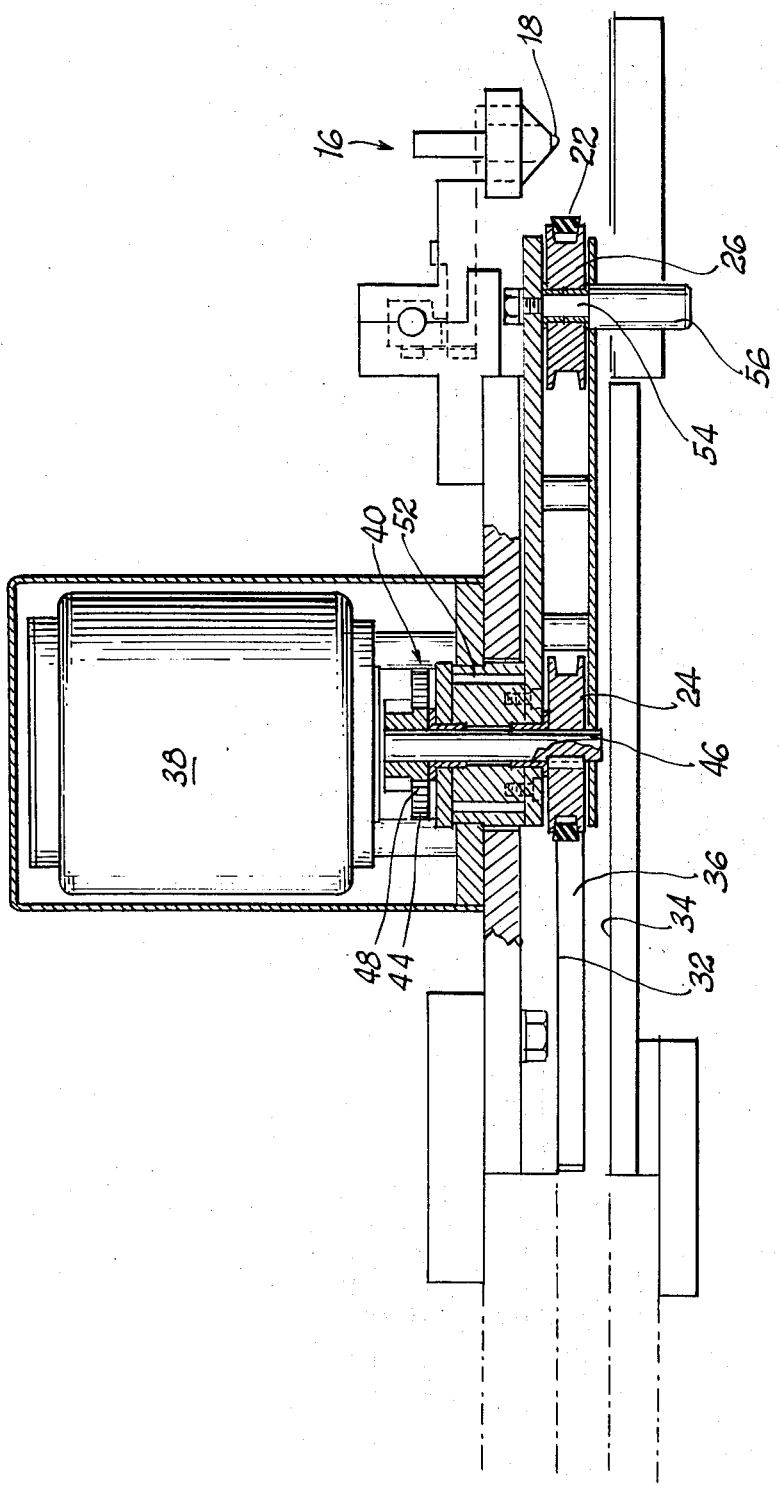

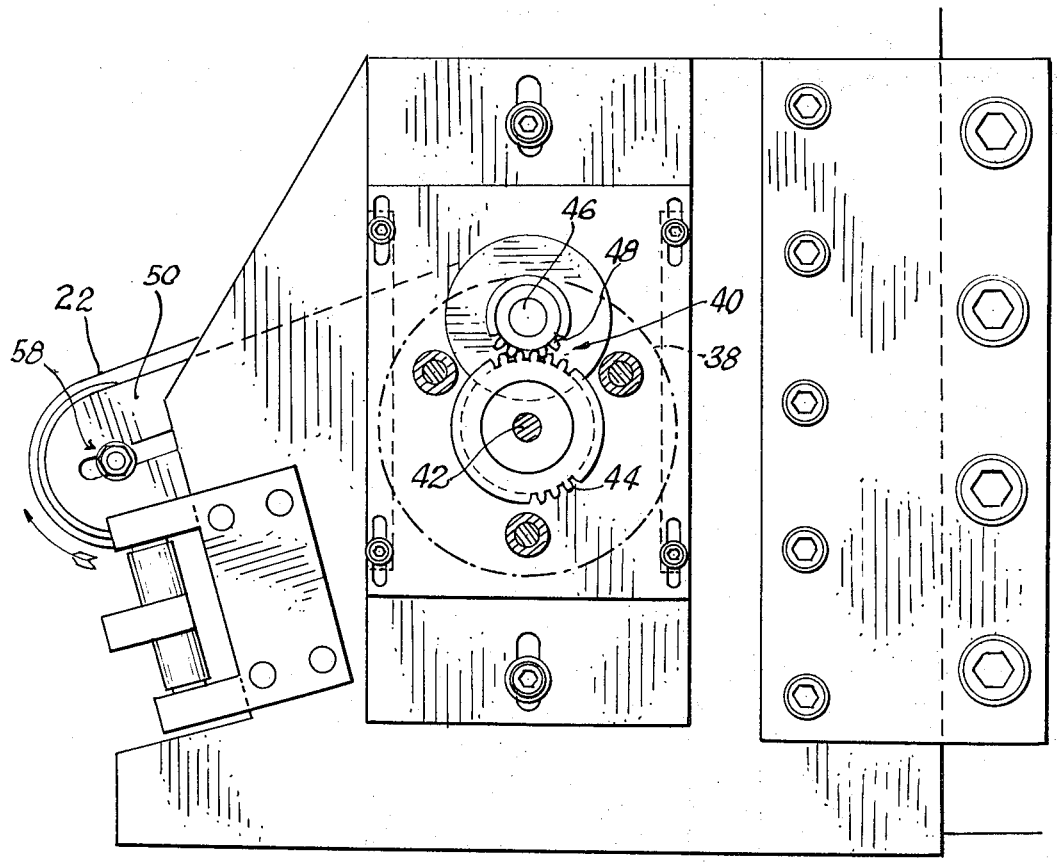

GAGING APPARATUS WITH FLOW CONTROL MECHANISM

This invention relates to gaging apparatus and pertains particularly to automatic gaging apparatus of the type in which work pieces are discharged from a machine tool past a gaging station where a gaging device checks one or more of the finished dimensions of the work pieces. If the size of the work pieces departs from the desired dimension, the gaging device produces a signal which is employed to adjust the machine tool so that the desired dimensional tolerance will be maintained, despite normal wear on the grinding wheel or other cutting device of the machine tool. Gaging apparatus of this type may be employed with a grinding machine or any other machine tool.

One object of the present invention is to provide a new and improved gaging apparatus having a mechanism for positively metering or controlling the flow of the work pieces into the gaging station so that the work pieces will be propelled at a steady, uniform speed, to avoid gaging inaccuracies which may be caused by excessive speed of the work pieces, or non-uniform speed as the work pieces are moved past the gaging station.

A further object is to provide such new and improved gaging apparatus in which the mechanism for controlling the flow of the work pieces is able to accommodate work pieces of various sizes, without readjustment of the flow control mechanism.

Another object is to provide such new and improved gaging apparatus in which the flow control mechanism affords easy access to the work pieces so that any possible jamming of the work pieces can be quickly and easily corrected.

Thus, the gaging apparatus of the present invention preferably comprises a gaging station which includes a gaging head or device for checking one or more finished dimensions of the work pieces. The gaging apparatus includes a flow control mechanism for propelling the work pieces at a steady, uniform speed past the gaging station. The flow control mechanism may comprise guide means for supporting and guiding the work pieces as they are moved past the gaging station, together with an endless belt or other drive element for engaging and propelling the work pieces along the guide means. Preferably, the endless drive element is strung around a drive pulley or the like and one or more additional pulleys, mounted on a supporting arm or carriage, which is preferably swingable about the axis of the drive pulley. In this way, the drive element and its supporting arm are able to swing upwardly and downwardly to accommodate work pieces of various sizes without any need to readjust the flow control mechanism. The drive belt preferably engages the upper extremities of the work pieces and is held against the work pieces by gravity. It is readily possible to swing the drive belt and its supporting arm upwardly away from the work pieces, to afford access to the work pieces. Thus, any possible jamming of the work pieces can readily be cleared.

Other objects, advantages, and features of the present invention will appear from the following description, taken with the accompanying drawings, in which:

FIG. 2 is a sectional view, taken generally along the line 2—2 in FIG. 1.

FIG. 3 is a rear elevation of the gaging apparatus.

Figure 1:
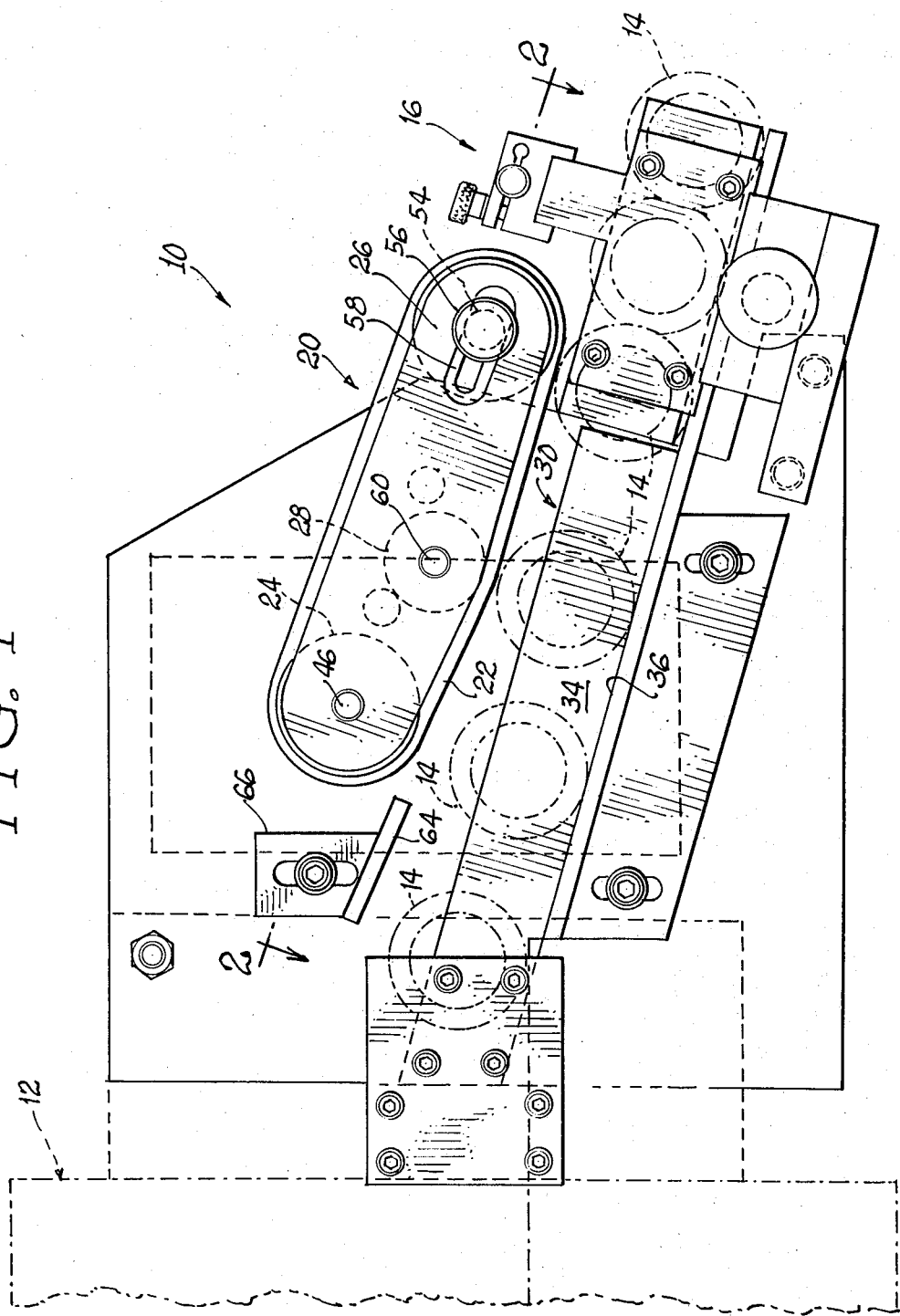
FIG. 1 is a diagrammatic front elevational view of new gaging apparatus with a mechanism for controlling the flow of the work pieces, to be described as an illustrative embodiment of the present invention.

As just indicated, the drawings illustrate a gaging apparatus 10, which may be used very advantageously in connection with a machine tool 12, which may be a grinding machine, for example. The machine tool 12 turns out a continuous flow of finished or partially finished work pieces 14, which are to be gaged by the gaging apparatus 10. In this case the work pieces 14 are in the form of rings, but they may assume any suitable form.

The work pieces 14 are caused to move past a gaging station 16 which includes one or more gaging devices 18, adapted to check one or more dimensions of the finished work pieces. For example, the illustrated gaging device 18, shown to best advantage in FIG. 2, may be arranged to gage the thickness of each work piece 14. This thickness is determined by the adjustment of the grinding machine or other machine tool 12. For example, the grinding machine 12 may be of the type having two grinding wheels for grinding opposite faces of the work pieces 14. The thickness of each work piece between the opposite faces is determined by the spacing between the grinding wheels.

The gaging device 18 may be connected into an automatic system for readjusting the machine tool 12 if the measured thickness of the work pieces deviates from the desired dimensions. Thus, if the thickness of the work pieces increases from the desired nominal dimension, due to normal wear on the grinding wheels, the gaging device 18 produces a signal which readjusts the machine tool 12 so that the grinding wheels are moved slightly closer together. In this way, the thickness of the work pieces is held within the required tolerance. Those skilled in the art will be familiar with automatic gaging systems of this kind.

The illustrated gaging apparatus comprises a flow control mechanism 20 for controlling the movement of the work pieces 14 so that they will be positively metered or moved into the gaging station 16 at a steady, uniform speed. In this way, a high order of accuracy can be maintained in the gaging operation.

In most cases, the work pieces 14 are discharged from the machine tool 12 at a high rate of speed which is somewhat irregular and cannot be accurately controlled. For example, each work piece 14 is often discharged from the machine tool 12 by an intermittent air blast which imparts considerable speed to the work pieces. In the absence of the present invention, the high speed of the work pieces and the non-uniform and irregular movement thereof make it difficult to maintain a high order of accuracy in the gaging of the work pieces by the gaging device 18.

In the illustrated gaging apparatus 10, the flow control mechanism 20 preferably comprises an endless drive element 22, which may be in the form of an endless belt, strung around a drive pulley 24 and one or more additional pulleys. In this case, there are two such additional pulleys 26 and 28.

The endless drive element 22 is effective to propel the work pieces 14 along guide means 30, arranged to carry the work pieces past the gaging station 16. The guide means 30 may assume various forms, such as the illustrated side guides 32 and 34, plus a lower guide 36. As shown, the guide means 30 has a downward inclination toward the gaging station 16 so that the movement of the work pieces 14 toward the gaging station 16 is assisted by gravity. The guide means 30 may assume any suitable form.

It will be seen from FIG. 1 that the endless belt or drive element 22 engaging the upper extremities of the work pieces 14 and positively meters or moves them along the guide means 30 and into the gaging station 16. The speed at which the work pieces 14 are controlled is sufficiently great to dispose of the work pieces at least as rapidly as they are discharged from the machine tool 12. However, the belt 22 may have the effect of slowing down the work pieces 14, particularly if they are discharged very rapidly from the machine tool 12 by an air blast.

A motor 38 is preferably provided to rotate the drive pulley 24 at a constant speed. As shown to best advantage in FIG. 3, a gear drive 40 or the like may be employed between the motor 38 and the drive pulley 24. The illustrated motor 38 has an output shaft 42 which carries a gear 44. The drive pulley 24 is secured to another shaft 46 which carries a gear 48, meshing with the gear 44. It will be understood that any suitable drive may be employed between the motor 38 and the drive pulley 24. It will be understood that the pulleys 26 and 28 are idler pulleys, driven by the movement of the belt or drive element 22.

The flow control mechanism 20 is preferably constructed to accommodate work pieces 14 of various sizes, while maintaining contact between the endless belt 22 and the work pieces. For this purpose, the pulleys 26 and 28 are preferably mounted on an arm or carriage 50, which is movable toward and away from the guide means 30 or the work pieces 14. In the illustrated construction, the arm or carriage 50 is swingable about the axis of the drive pulley 24. In this way, the arm or carriage 50 can be swung about such axis without affecting the tension in the endless belt 22. As shown to best advantage in FIG. 2 the arm or carriage 50 may be swingably supported by a bearing 52 which is co-axial with the shaft 46 of the drive pulley 24.

The illustrated idler pulley 26 is rotatable about a shaft 54, mounted on the outer end portion of the arm or carriage 50. The shaft 54 may have a forwardly projecting end portion 56 which serves as a handle, to be lifted manually when it is desired to raise the belt 22 out of engagement with the work pieces 14. An adjusting mechanism 58 may be provided to adjust the position of the shaft 54 so as to take up any slack in the belt 22, and to regulate the tension in the belt. The other idler pulley 28 is rotatably mounted on a shaft 60, which is mounted on the arm or carriage 50. The pulley 28 is in a position in which it produces a downward lateral deflection of the endless belt 22, so that the work pieces 14 are able to move freely into engagement with the belt 22, approximately opposite the point where it is engaged by the pulley 28.

When the machine tool 12 is started, it turns out a continuous series or flow of the work pieces 14. The arm or carriage 50 is swung upwardly to permit the work pieces 14 to travel along the guide means 30, under the propulsion of the continuously moving endless belt 22. The ability of the arm or carriage 50 to swing about the axis of the drive pulley 24 makes it possible for the flow control mechanism 20 to accommodate work pieces 14 of various sizes. Any variation in the diameter of the work pieces 14 during the operation of the control mechanism 20 does not affect the ability of the belt 22 to engage and propel the work pieces.

In this case, the gaging apparatus includes a deflector 64 in the form of an inclined bar or other guide, adapted to deflect the work pieces 14 downwardly toward the guide means 30, as the work pieces are discharged from the machine tool 12. The deflector 64 may be mounted on an adjustable mounting bracket 66.

It will be recognized that the endless drive element 22 assumes control over the work pieces 14 as they are discharged from the machine tool 12, and positively meters or moves the work pieces 14 at a steady, uniform speed along the guide means 30 into the gaging station 16. The steady, uniform speed makes it possible to carry out the gaging operation with a high order of accuracy. If the size of the work pieces varies, the swingable supporting arm or carriage 50 floats upwardly and downwardly so that a driving contact is maintained between the endless drive element 22 and the work pieces 14.

The swingable arm 50 and the endless drive element 22 can be swung upwardly by manually lifting the handle 56 so as to afford easy access to the work pieces 14 on the guide means 30. Thus, it is easy to clear any jamming of the work pieces that may occur along the guide means 30.

While the endless drive element 22 is preferably a belt made of rubber or some other flexible material, it may be in the form of any suitable chain, in which case the wheels 24 and 26 and 28 to support the drive element may take the form of sprockets.

Various other modifications, alternative constructions and equivalents may be employed, as will be evident to those skilled in the art.

I claim:

1. Gaging apparatus for gaging a procession of workpieces,
    comprising a gaging station including gaging means for checking at least one dimension of each of the workpieces,
    guide means including a downwardly inclined guide ramp for supporting and carrying the workpieces past said gaging station,
    a first pulley disposed in a vertical plane above said guide ramp and rotatable about a horizontal axis,
    motor means for rotating said pulley,
    a carriage disposed above said guide ramp,
    means supporting said carriage for swinging movement about the axis of said pulley in a generally vertical direction toward and away from said guide ramp,
    said carriage being biased downwardly by gravity toward said guide ramp,
    a second pulley rotatably mounted in a vertical plane on said carriage and swingable therewith toward and away from said guide ramp,
    an endless drive belt strung around said first and second pulleys for positively moving the workpieces along said guide ramp at a controlled speed toward said gaging station,
    said drive belt being swingable upwardly and downwardly with said carriage to accommodate workpieces of varying sizes,
    said drive belt having upper and lower flights extending between said first and second pulleys, and a third pulley rotatably mounted on said carriage between said first and second pulleys and deflecting said lower flight of said drive belt downwardly toward said guide ramp for causing the workpieces to be movable freely along said guide ramp into engagement with the lower flight of said drive belt opposite said third pulley whereupon the drive belt moves the workpieces along said guide ramp and past said gaging station at a controlled rate.

* * * * *